US012533277B2

(12) United States Patent
Fisher et al.

(10) Patent No.: US 12,533,277 B2
(45) Date of Patent: Jan. 27, 2026

(54) HEAD CRADLE FOR SURGERY

(71) Applicant: The Nemours Foundation, Jacksonville, FL (US)

(72) Inventors: Phoebe Fisher, Coatesville, PA (US); Tariq Rahman, Wilmington, DE (US); Jinyong Wee, Chesterbrook, PA (US)

(73) Assignee: THE NEMOURS FOUNDATION, Jacksonville, FL (US)

( * ) Notice: Subject to any disclaimer, the term of this patent is extended or adjusted under 35 U.S.C. 154(b) by 110 days.

(21) Appl. No.: 18/181,005

(22) Filed: Mar. 9, 2023

(65) Prior Publication Data

US 2023/0310247 A1 Oct. 5, 2023

Related U.S. Application Data

(60) Provisional application No. 63/326,414, filed on Apr. 1, 2022.

(51) Int. Cl.
*A61G 13/12* (2006.01)

(52) U.S. Cl.
CPC ......... *A61G 13/121* (2013.01); *A61G 13/126* (2013.01)

(58) Field of Classification Search
CPC ........... A42B 3/00; A42B 3/04; A42B 3/0473; A42B 3/062; A42B 3/20; A61G 13/121; A61G 13/126
See application file for complete search history.

(56) References Cited

U.S. PATENT DOCUMENTS

| | | | | |
|---|---|---|---|---|
| 3,132,345 | A * | 5/1964 | Keith | A42B 3/20 2/9 |
| 5,269,035 | A * | 12/1993 | Hartunian | A47C 20/026 5/639 |
| 6,490,737 | B1 * | 12/2002 | Mazzei | A61G 13/12 2/9 |
| 8,648,900 | B2 * | 2/2014 | Vu | A61G 13/12 348/78 |
| 2015/0089720 | A1 * | 4/2015 | Abbey | A42B 3/0473 2/411 |
| 2017/0020223 | A1 * | 1/2017 | Abbondanza | A42B 3/069 |

OTHER PUBLICATIONS

Proneview Protective Helmet, Mizuho OSI, 6 pages, 2016.

* cited by examiner

*Primary Examiner* — Adam C Ortiz
(74) *Attorney, Agent, or Firm* — Faegre Drinker Biddle & Reath LLP

(57) ABSTRACT

A head cradle for supporting a head of a patient during surgery when the patient is in a prone position. The head cradle includes a structural member with a body having a concave profile, a first end and a second end. The body has a forehead portion positioned at the first end for supporting a forehead of a patient and at least one cheek portion for supporting a cheek of the patient. The body includes an aperture defined through the structural member adjacent to the forehead portion between the first end and the second end. The structural member is sized to terminate at a position at or superior to a chin of the patient. A support member is provided to be received by the structural member and to interface with at least a portion of a face of the patient.

17 Claims, 7 Drawing Sheets

HEAD CRADLE FOR SURGERY

RELATED APPLICATION

The present application relates to and claims priority from U.S. Provisional Application No. 63/326,414, filed on Apr. 1, 2022, the disclosure of which is incorporated herein by reference in its entirety.

TECHNICAL FIELD

Various aspects of the present disclosure relate to head cradles for use in surgeries. In some specific examples, various aspects of the present disclosure are directed toward apparatuses, systems, and methods that allow a patient to be positioned during surgery.

BACKGROUND

Patients undergoing posterior spinal surgery are placed on a surgical table in the prone position. There are many known complications of spinal surgery, including but not limited to blindness. For example, central retinal artery occlusion is usually caused by direct external pressure on the globe. Common findings are unilateral vision loss with signs of external periorbital swelling or ecchymosis. Also present are a pale ischemic retina with a pathognomonic cherry-red spot at the macula and a relative afferent pupillary defect or reduced pupillary light reflex. Central retinal artery occlusion is the second most common cause of blindness following prone-position spinal surgery, and it can be prevented by proper positioning of the patient in a surgical head frame. Central retinal artery occlusion can also occur as a result of emboli and from increased intraocular pressure. Patients in the prone position may experience increased intraocular pressure. This increased intraocular pressure combined with environmental insult might cause vision loss in some individuals, especially in those who have undergone extended prone spinal surgeries.

Some head cradles are currently used to support the patient's head during surgery and allow the anesthesiologist to make rapid and frequent assessment of the patient's eyes throughout the procedure. However, current head cradles are ineffective for use with patients having an anatomy with short chin-to-shoulder distances. For example, a common spinal surgery in the prone position will include the patient resting on the surgical table with a shoulder buttress affixed to the table. The shoulder buttress rests at the level of the patient's sternum. The patient's head is placed in a head cradle which has gaps for the eyes, face, and nose, the head cradle sitting unaffixed to the table. This allows the patient's head to be supported and for the cervical spine to be in a neutral position for surgery. A patient having a typical neck length will be positioned with the shoulder buttress and the head cradle such that the shoulder buttress and the head cradle have a gap therebetween. This allows the patient's head to rest properly and safely in the head cradle with pressure distributed evenly on the bony structure of the patient's face, with the patient's eyes positioned clear of the head cradle cushions to keep pressure from being applied to the eyes of the patient. During spinal surgery, the surgeon may be required to push and pull on the spine, which can result in movement of the body relative to the shoulder buttress, thus causing the patient's head to also move. With adequate clearance between the shoulder buttress and the head cradle, the head cradle is able to move with the patient's head.

However, in patients with shortened chin to shoulder ratios (e.g., pediatric patients, patients with growth disorders such as achondroplasia, or muscle-bound patients), head cradles are necessarily positioned abutting the shoulder buttress in order to position the patient's face within the head cradle while having the patient's body appropriately positioned with the shoulder buttress. By having the shoulder buttress and the head cradle in contact, when the spine is manipulated in surgery, the head cradle is unable to move with the face of the patient. This can result in the patient being incorrectly repositioned on the shoulder buttress or the head cradle during surgery as the spine is manipulated. For example, the patient can slide caudally a short distance on the shoulder buttress. Because there is no space for the head cradle to move with the patient's face, the patient's neck can be forced into extension, which can cause pressure to be concentrated on the chin. Furthermore, the head can shift in the head cradle such that the portions of the head cradle intended to support the bony structures of the face can be pushed into the patient's eyes. This extension of the neck occurs under the surgical drapes and can be hard to appreciate by either the surgeon or anesthesiologist. In addition to increasing the risk of blindness, the extension of the neck can lead to suboptimal surgical outcomes, and, as many of the patients with skeletal dysplasia have cervical spinal canal stenosis, can put the cervical spinal cord at risk for injury.

Various aspects of the present disclosure are directed toward overcoming these shortcomings, as well as other additional or alternative advantages.

SUMMARY

Various aspects of the present disclosure are directed toward apparatuses, systems, and methods that include a head cradle.

In an embodiment a head cradle is disclosed for supporting a head of a patient during surgery when the patient is in a prone position. The head cradle includes a structural member including a body having a concave profile and defining a first end and a second end, the body including a forehead portion positioned at the first end and operable to support a forehead of a patient and at least one cheek portion operable to support a cheek of the patient. The body including at least one aperture defined through the structural member at a position adjacent the forehead portion between the first end and the second end, the at least one aperture being operable to align with eyes of the patient and at least one of the nostrils and mouth of the patient, the second end of the structural member sized to terminate at a position at or superior to a chin of the patient. A support member is provided that is operable to be received by the structural member and to interface with at least a portion of a face of the patient.

The body of the structural member preferably includes a first side and a second side, wherein the structural member includes a strip extending from the first side to the second side at the second end of the body of the structural member.

The strip may be an integral portion of the body of the structural member, or could be a separate member that is fastened to the body of the structural member. The strip is preferably operable to resist outward movement of the first side and the second side at the second end of the body of the structural member when the head of the patient is positioned in the head cradle. The strip may be thicker than remaining portions of the body of the structural member. The strip may be operable to support the chin of the patient.

The structural member preferably further includes at least one spacer extending from the body, the at least one spacer operable to elevate the body of the structural member from a surface. The at least one spacer may comprise two spacers extending from the forehead portion of the body of the structural member and two spacers extending from the at least one cheek portion of the body of the structural member.

In an embodiment a support member is provided for a head cradle for supporting a head of a patient during surgery when the patient is in a prone position. The support member includes a body defining a first end and a second end, the body including a forehead portion positioned at the first end and operable to support a forehead of a patient and at least one cheek portion operable to support a cheek of the patient. The body includes at least one aperture defined through the support member at a position adjacent the forehead portion between the first end and the second end, the at least one aperture being operable to align with eyes of the patient and at least one of the nostrils and mouth of the patient, the body including a removable portion positioned at the second end of the body.

The body preferably includes a line of perforations between the second end and the at least one aperture, the removable portion being defined between the perforations and the second end.

The body may include a recessed portion operable to receive the head of the patient, wherein the forehead portion and the at least one cheek portion are defined at least partially within the recessed portion.

At least a portion of the line of perforations may extend through the body along at least a portion of the recessed portion.

The body includes a first side and a second side, and the line of perforations extends from the first side to the second side.

In an embodiment, the line of perforations includes a curved shape.

The support member may be made from a foam material.

The body may be injection molded.

A coating may be applied to the body.

While multiple, inventive examples are specifically disclosed, various modifications and combinations of features from those examples will become apparent to those skilled in the art from the following detailed description. Accordingly, the disclosed examples are meant to be regarded as illustrative in nature and not restrictive.

DETAILED DESCRIPTION

Various aspects of the present disclosure are directed toward apparatuses, systems, and methods that include a head cradle that may be implemented to protect a patient during spinal surgery. In various examples, the head cradle, as discussed herein, help provide appropriate support to the patient's head without placing pressure on the patient's eyes and maintaining a line of sight to the patient's eyes. In certain instances, the components of the head cradle are implemented together or can be implemented in existing systems.

Figure 1:
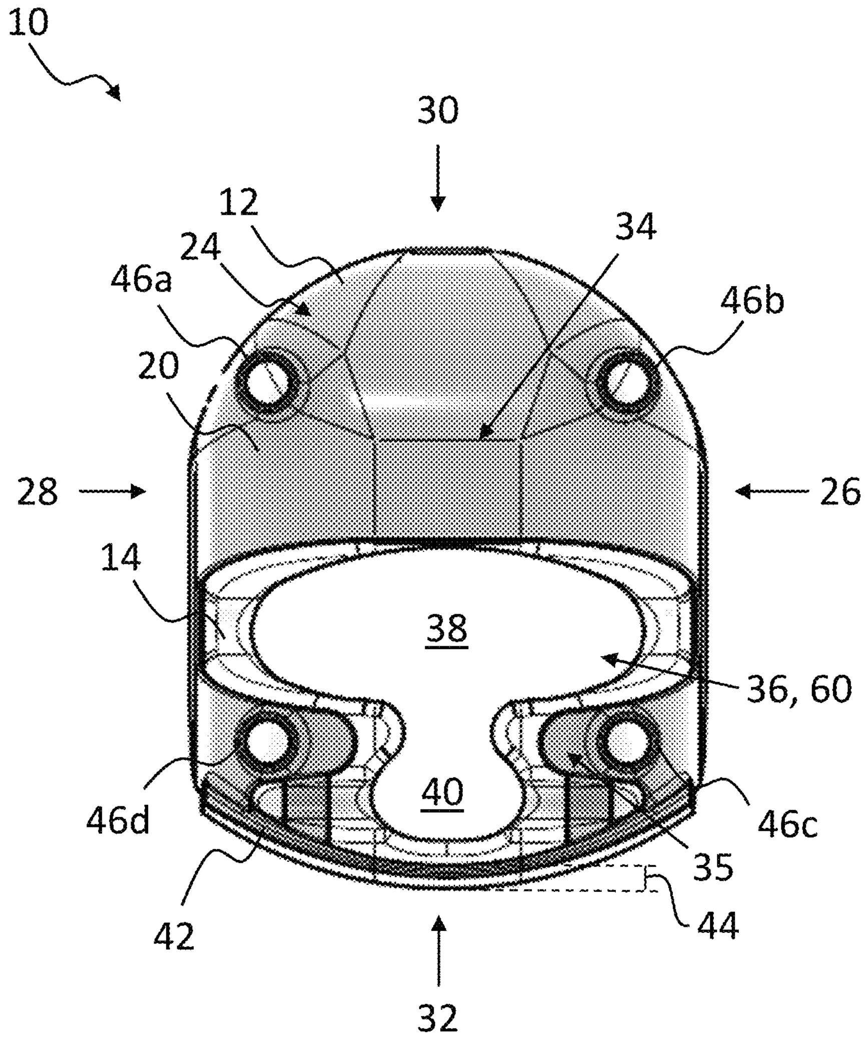
FIG. 1 is a front view of a head cradle having a structural member and a support member, illustrating an exterior surface of the structural member in detail, in accordance with an embodiment.

FIG. 1 is an illustration of a head cradle 10 for supporting a head of a patient during surgery (e.g., spinal surgery). The head cradle 10 includes a structural member 12 and a support member 14. The structural member 12 is operable to provide the structural support for supporting the head of a patient during the surgery and can, in some embodiments, elevate the patient's head from the surgical table during surgery. The structural member 12 interfaces with the surgical table (and in some embodiments a mirror, which allows the anesthesiologist to quickly assess the eyes of the patient during surgery. The support member 14 is operable to be received and supported by the structural member 12 and interface with at least a portion of the patient's face. The support member 14 is formed to receive the patient's face and shaped to interface with the patient's face such that the bony structures of the patient's face are contacting the support member 14 (e.g., forehead and bony portions of the cheek). The patient's head is interfaced with the support member 14 and the structural member 12 cradles the patient's head via the support member 14.

Figure 2:
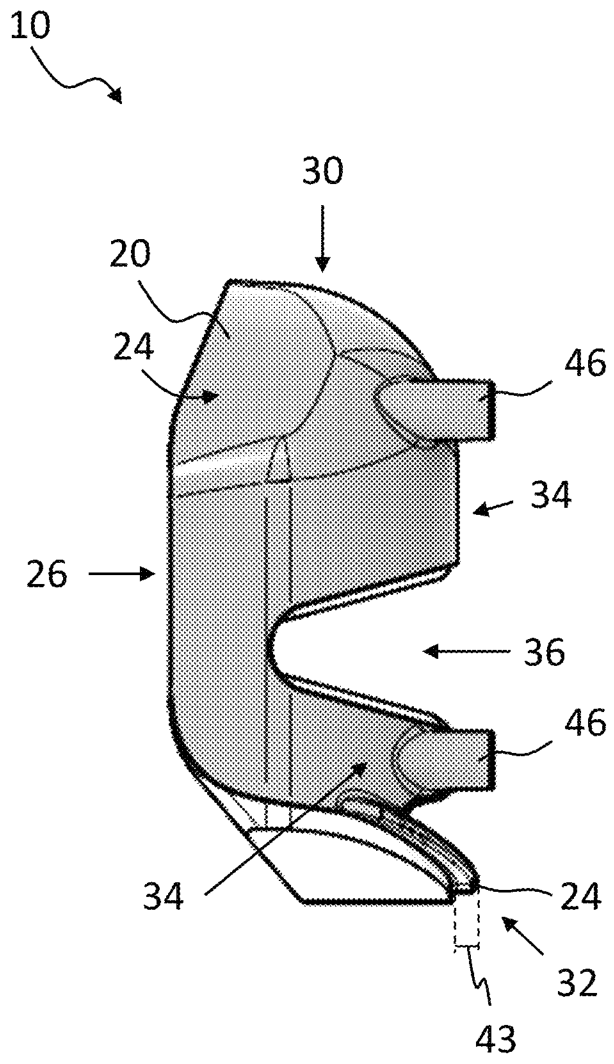
FIG. 2 is a side view of the head cradle of FIG. 1, in accordance with an embodiment.
Figure 3:
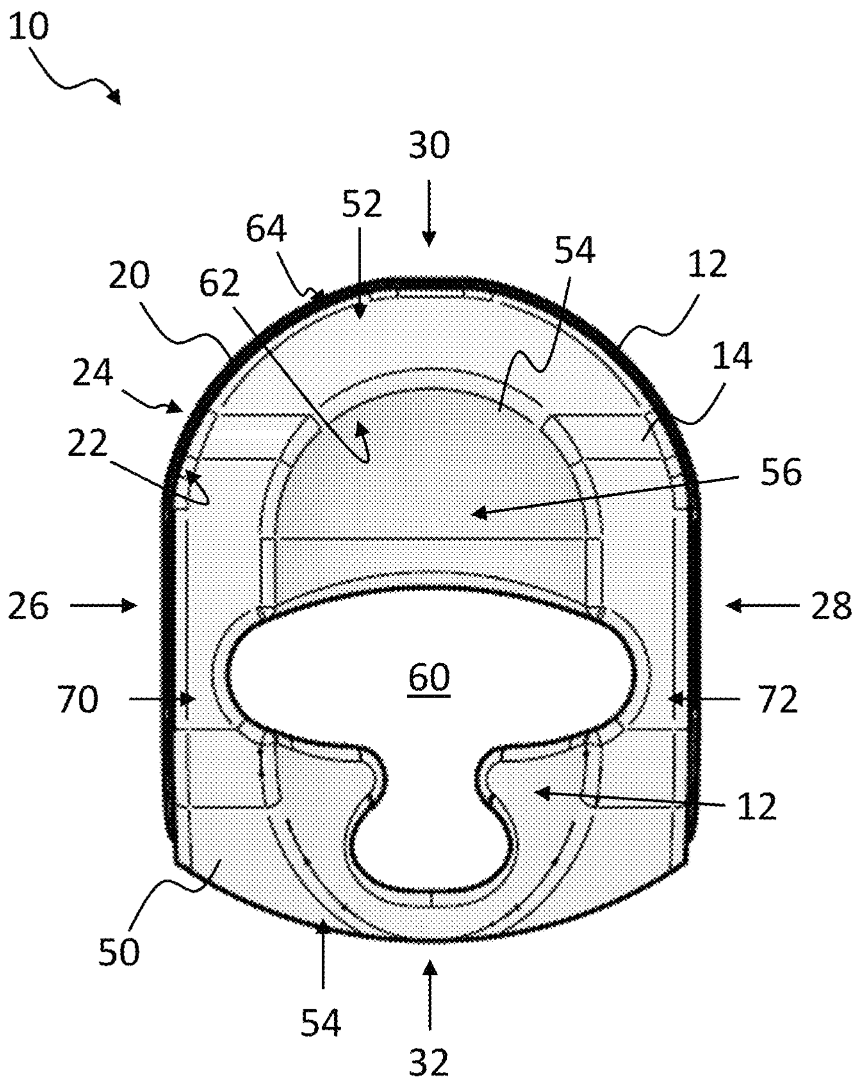
FIG. 3 is a back view of the head cradle showing an interior surface of the support member of FIG. 1, in accordance with an embodiment.
Figure 4:
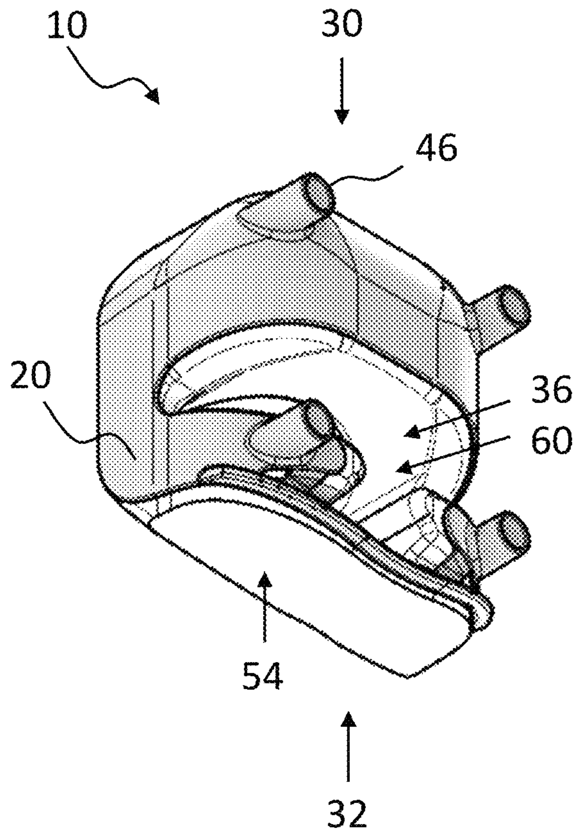
FIGS. 4 and 5 are perspective views of the head cradle of FIG. 1, in accordance with an embodiment.
Figure 5:
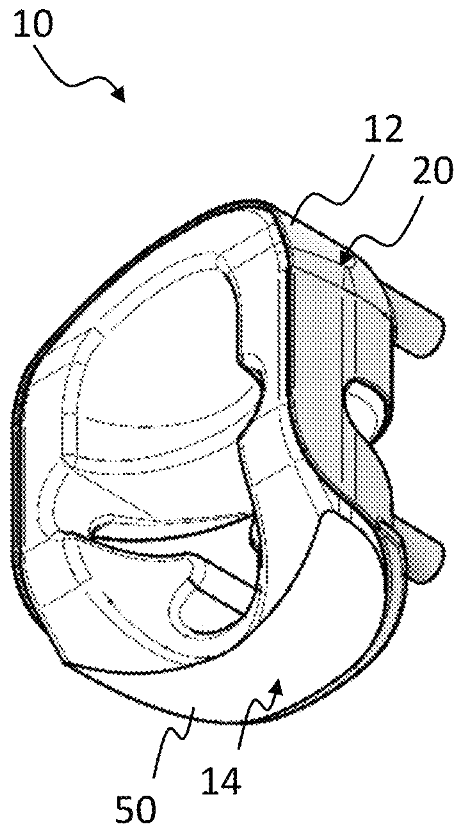

Referring to FIGS. 2 and 3, the structural member 12 is shown in greater detail. For example, the structural member includes a body 20 defining an inner surface 22 and an outer surface 24, the inner surface 22 having a generally concave profile. The inner surface 22 profile is configured to receive the support member 14 and the head of the patient as will become more apparent below. The body 20 of the structural member 12 includes a first side 26 (e.g., lateral side), a second side 28 (e.g., lateral side), a first end 30 (longitudinal end), and a second end 32 (e.g., longitudinal end). The body 20 defines a forehead portion 34 that is operable to support the forehead of a patient (via the support member 14). The body 20 also defines cheek portions 35 that are operable to support the cheeks of a patient (via the support member 14). The structural member 12 further includes at least one aperture 36 formed through the body 20. As shown in FIG. 1, the aperture 36 includes a first portion 38 and a second portion 40. The first portion 38 is positioned such that when a patient's head is positioned with the head cradle 10, the patient's eyes are generally aligned with the first portion 38 of the aperture 36. The positioning of the first portion 38 of the aperture 36 relative to the body 20 is adjacent to the forehead portion 34 at the first end 30 of the body 20 between the first and second ends 30, 32 of the body 20. The second portion 40 is positioned such that when a patient's head is positioned with the head cradle 10, the patient's nose and/or mouth are aligned with the second portion 40 of the aperture 36. The first and second portions 38, 40 may be separate apertures in some embodiments or may be a single aperture.

The body 20 of the structural member 12 is sized such that the second end 32 terminates at or superior to the chin of the patient. In some embodiments, this means that the aperture 36 is positioned adjacent the second end 32 of body 20. Stated otherwise, the body 20 defines a strip 42 between the aperture 36 and the second end 32. The strip 42 is operable to limit laterally outward movement of the first and second sides 26, 28 when supporting the patient's head. Because of the aperture 36 and specifically the size of the aperture 36, the first and second sides 26, 28 may have a propensity to slide laterally outward. However, the strip 42 limits outward lateral movement of the first and second sides 26, 28 by tension being applied across the strip 42. In some embodiments, the strip 42 extends from the first side 26 to the second side 28 at the second end 32 of the body 20 of the structural member 12.

The strip 42 can be a chin support in some embodiments. In other embodiments, the head cradle 10 is formed such that when a patient's head is received, the strip 42 does not support the weight of the patient's head. In some embodiments, the strip 42 includes a thickened profile (e.g., depth 34 or thickness of the body 20 and not thickness in the longitudinal direction of the body 20, see FIG. 2). For example, the strip 42 may be thicker than the remainder of the body 20 of the structural member 12. For example, the depth 34 of the strip 42 may be about 1-2 cm. This allows the strip 42 to be able to be tensioned, and in some embodiments support a portion of the weight of the patient's head, without the strip deforming or breaking.

The strip 42 includes width 44 (e.g., the width of the surface profile) that is one centimeter or less. For example, the strip 42 has width 44 from 0.1 cm to about 1.0 cm. In some embodiments, the width 44 of the strip 42 is about 0.5 cm. In some embodiments, the strip 42 is integral with the body 20. For example, the structural member 12 may be 3D printed, injection molded, or manufactured such that the strip 42 is integrally formed with the body 20. In other embodiments, the strip 42 is adhered, attached, fastened, or otherwise coupled to the body 20. For example, the strip 42 may be a strap that is coupled the body 20. The strip 42 may also be removably coupled to the body 20.

By implementing the strip 42, the structural member 12 includes a profile that is optimized for use in spinal surgery that use a shoulder buttress (not shown). The minimal profile (e.g., the longitudinal length) of the structural member 12, specifically at the second end 32, that is facilitated by the strip 42 allows for the structural member 12 to be implemented with the shoulder buttress for patients with relatively short chin-to-shoulder ratios (e.g., pediatric patients, patients with growth disorders, or muscle-bound patients). The strip 42 allows for a gap to be present between the structural member 12 and the shoulder buttress during surgery, thus limiting mechanical interference between the structural member 12 and the shoulder buttress, which can result in the repositioning of the patient's face within the head cradle 10.

Referring to FIG. 1, the structural member 12 further includes at least one spacer 46. The spacers 46 extend from the outer surface 24 of the body 20. The spacers 46 are operable to space the patient's head from the operating table (e.g., the spacers 46 elevate the body 20 of the structural member 12 from off of a surface such as an operating table). This facilitates both appropriate positioning of the patient's head for surgery, provides downward (vertical) support for the structural member and the patient's head, and also facilitates line of sight to the patient's eyes during the surgery (e.g., a mirror may be placed vertically below the head cradle 10 which allows the anesthesiologist to see the patient's eyes through the aperture 36 via the mirror). Various numbers of spacers 46 may be implemented in various configurations. For example, the structural member 12 may include four spacers 46 to provide stability while also minimizing the profile such that line of sight is maintained with the patient's eyes. In one example, two of the spacers 46*a*, 46*b* extend from the outer surface 24 on opposite (lateral) sides of the forehead portion 34. The spacers 46*a*, 46*b* are laterally spaced from each other such that one is positioned toward the first side 26 and the other is positioned toward the second side 28. Two more spacers 46*c*, 46*d* extend from the outer surface 24 opposite the cheek portion 35. The spacers 46*c*, 46*d* are laterally spaced from each other such that one is positioned toward the first side 26 and the other is positioned toward the second side 28. By placing the spacers 46 under the positions that support the patient's head (e.g., the forehead portion 34 and the cheek portion 35), the spacers 46 provide support and stability to the head cradle 10.

The inner surface 22 of the structural member 12 is operable to receive the support member 14. The support member 14 interfaces with at least a portion of the face of the patient (e.g., the forehead, cheeks, and/or chin). The support member 14 can function as a liner that allows the head cradle 10 to comfortably support the patient's head by distributing the weight of the patient's head across a greater surface area of the patient's face. A variety of materials are contemplated and may be implemented for providing a support member 14, including but not limited to compressible materials such as foams, shape-memory foams, polymers, natural materials such as cotton or down, and so forth. The support member 14 could include a contour that facilitates engagement with the patient's face.

Referring to FIG. 3, the support member 14 includes a body 50 defining a first end 52 and a second end 54. The first and second ends 52, 54 generally correspond to the first and second ends 30, 32 of the structural member 12 when the support member 14 is supported by the structural member 12. The body 50 further includes a forehead portion 56 positioned at the first end 52 that is operable to support the forehead of the patient and cheek portions 58 operable to support the cheeks of the patient. That is, the forehead portion 56 and the cheek portion 58 interface with the face of the patient during use. In some embodiments, the body 50 includes a recessed portion 55 for receiving at least a portion of the patient's face. The cheek portion 58 and the forehead portion 56 may be at least partially defined within the recessed portion 55.

The body 50 of the support member 14 includes at least one aperture 60 defined through the support member 14 at a position adjacent the forehead portion 56 between the first end 52 and the second end 54. The aperture 60 of the support member 14 generally aligns with the aperture 36 of the structural member 12. Thus, when the structural member 12 and the support member 14 are positioned together and are supporting the head of the patient, both apertures 36, 60 generally align with eyes of the patient and at least one of the nostrils and mouth of the patient. This facilitates a line of sight with the patient's eyes and allows the patient to breathe during the operation.

The body 50 further includes a first surface 62 and a second surface 64. The first surface 62 interfaces with the structural member 12. Because the structural member 12, in some embodiments, includes a concave inner surface 22, the support member 14 is shaped to conform to the concave profile. The corresponding fit of the profiles can retain the support member 14 with the structural member 12. In some embodiments, the support member 14 may be fastened to the structural member 12 (e.g., via hook and loop fasteners, adhesives, and so forth).

Figure 6:
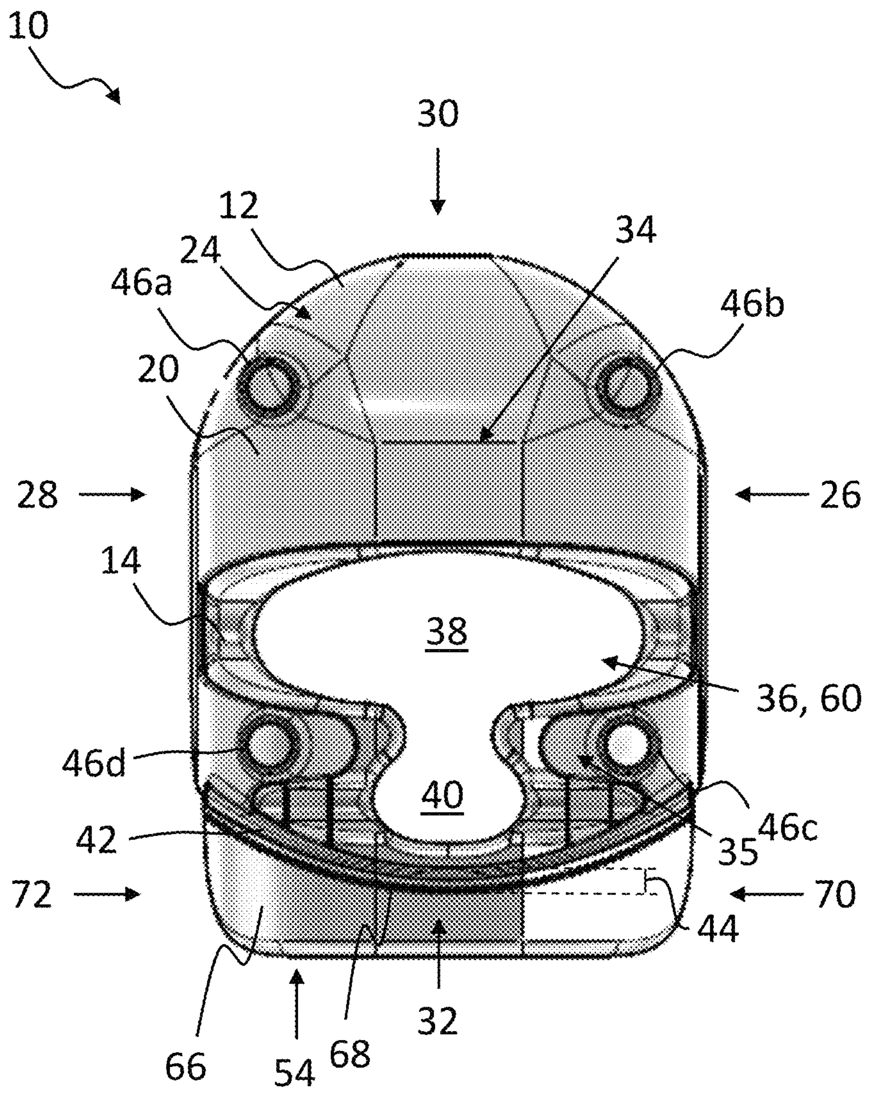
FIG. 6 is a front view of a head cradle having a structural member and a support member, the support member including a removal chin portion and the figure illustrating an exterior surface of the structural member in detail, in accordance with an embodiment.
Figure 7:
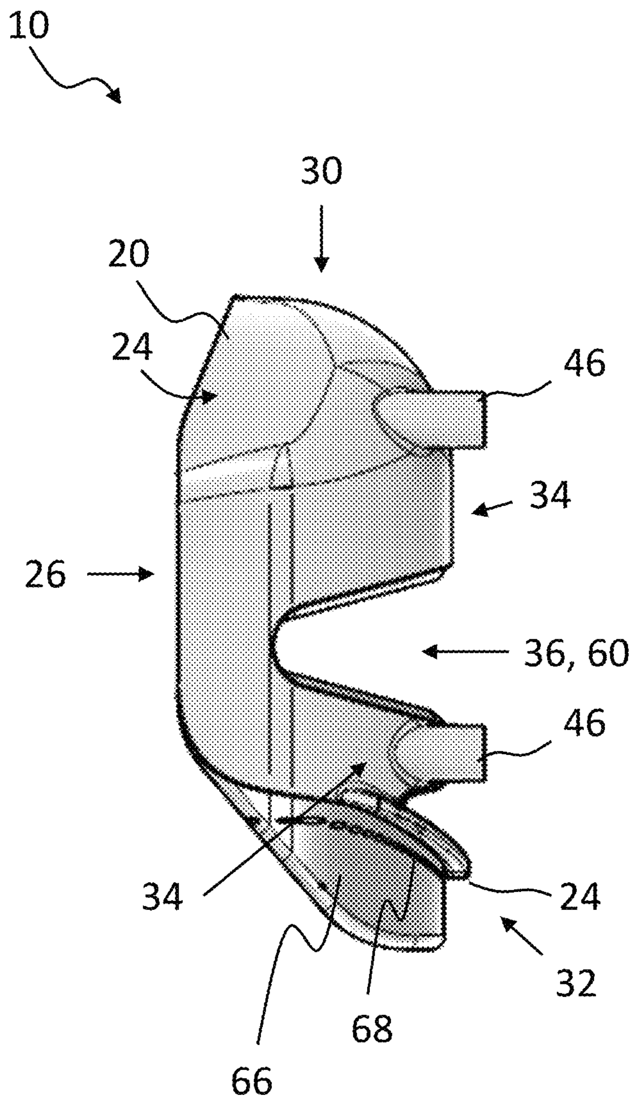
FIG. 7 is a side view of the head cradle of FIG. 6, in accordance with an embodiment.
Figure 8:
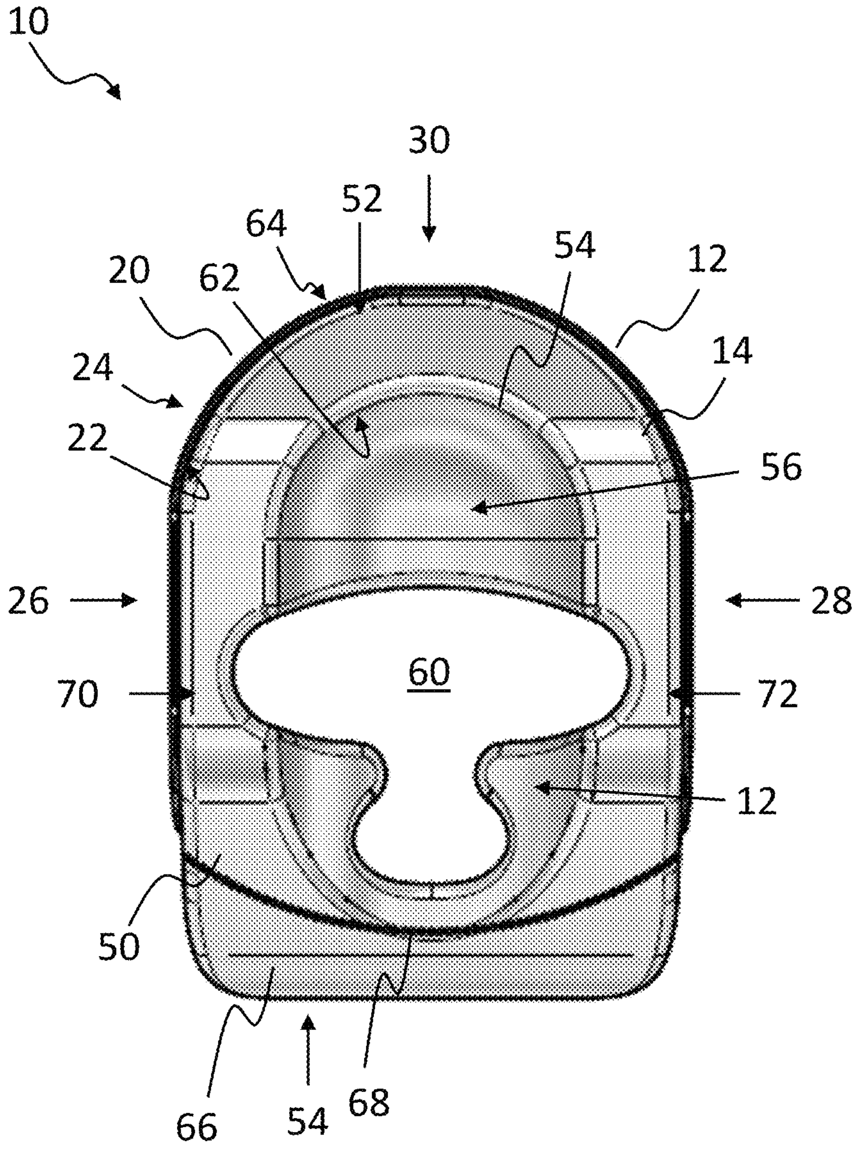
FIG. 8 is a back view of the head cradle showing an interior surface of the support member of FIG. 6, in accordance with an embodiment.

The support member 14 may be disposable such that a new support member 14 is used for each patient. In some embodiments, the support member 14 may be used with a variety of systems or head cradles. For example, in some embodiments, the support member 14 includes a chin support portion 66 that is operable to support a patient's chin during surgery (see FIG. 6-8). Because of the profile of the structural member 12 discussed herein, the chin portion 66 may not be necessary and, in some embodiments, may interfere with the use of the head cradle 10 during surgery (e.g., for patients with relatively low chin-to-shoulder distances), a support member 14 with a no chin support portion or a minimal chin support portion may need to be implemented. The support member 14 may be provided without a chin portion, or in some embodiments such as shown in FIGS. 6-8, a removable chin portion 66 may be provided. Thus, the surgeon may select the appropriately sized structural member 12 and implement the support member 14 regardless of the structural member selected by removing the chin portion 66 if necessary. It is understood that the support member 14 shown in FIGS. 1-5 could either be manufactured without a chin support portion or illustrates the support member 14 of FIGS. 6-8 with the removable chin portion 66 removed from the support member 14.

In some embodiments, the removable chin portion 66 is provided by including a line of perforations 68. The line of perforations 68 allow the surgeon to quickly reconfigure the support member 14 for the specific patient or application in which it is being used. In some embodiments, the line of perforations 68 extend from a first lateral side 70 to a second lateral side 72. The line of perforations 68 is positioned between the second end 54 of the body 50 and the aperture 60. Thus, the removable chin portion 66 is defined between the line of perforations 68 and the second end 54. In some embodiments, at least a portion of the line of perforations 68 extend through the body 50 along at least a portion of the recessed portion 55. In other embodiments, the line of perforations 68 extend along a planar surface of the body 50 of the support member 14 (not shown). In some embodiments, the line of perforations 68 includes a curved shape. The curved shape may be implemented to provide sufficient support for the patient while also providing adequate clearance between the head cradle 10 and a shoulder buttress (not shown). In other embodiments, the line of perforations 68 is linear. In some embodiments, a coating (not shown) may be applied to the body 50. The coating may be implemented to provide desirable attributes such as breathability, liquid absorption, anti-microbial properties, and so forth.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The particular implementations shown and described herein are illustrative examples of the invention and are not intended to otherwise limit the scope of the invention in any way. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

Terms such as "about" or "approximately", unless otherwise defined or restricted in the specification, should be understood to define a variance of plus or minus 5%-10% to the numerical term referred to.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed. The various embodiments and elements can be interchanged or combined in any suitable manner as necessary.

The use of directions, such as forward, rearward, top and bottom, upper and lower are with reference to the embodiments shown in the drawings and, thus, should not be taken as restrictive. Reversing or flipping the embodiments in the drawings would, of course, result in consistent reversal or flipping of the terminology.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A head cradle for supporting a head of a patient during surgery when the patient is in a prone position, the head cradle comprising:

a structural member including a body having a concave profile and defining a first end and a second end, the body including a forehead portion positioned at the first end and operable to support a forehead of a patient and at least one cheek portion operable to support a cheek of the patient, the body including at least one aperture defined through the structural member at a position adjacent the forehead portion between the first end and the second end, the at least one aperture being operable to align with eyes of the patient and at least one of the nostrils and mouth of the patient, the second end of the structural member sized to terminate at a position at or superior to a chin of the patient; and a support member operable to be received by the structural member and to interface with at least a portion of a face of the patient, wherein the support member includes a line of perforations between the second end and the at least one aperture, the removable portion being defined between the perforations and the second end, and wherein the support member includes a first side and a second side, wherein the line of perforations extends from the first side to the second side.

2. The head cradle of claim 1, wherein the body of the structural member includes a first side and a second side, wherein the structural member includes a strip extending from the first side to the second side at the second end of the body of the structural member.

3. The head cradle of claim 2, wherein the strip is an integral portion of the body of the structural member.

4. The head cradle of claim 2, wherein the strip is a separate member that is fastened to the body of the structural member.

5. The head cradle of claim 2, wherein the strip is operable to resist outward movement of the first side and the second side at the second end of the body of the structural member when the head of the patient is positioned in the head cradle.

6. The head cradle of claim 2, wherein the strip is less than about 1.0 cm wide.

7. The head cradle of claim 2, wherein the strip is thicker than remaining portions of the body of the structural member.

8. The head cradle of claim 2, wherein the strip is operable to support the chin of the patient.

9. The head cradle of claim 1, wherein the structural member further includes at least one spacer extending from the body, the at least one spacer operable to elevate the body of the structural member from a surface.

10. The head cradle of claim 9, wherein the at least one spacer includes two spacers extending from the forehead portion of the body of the structural member and two spacers extending from the at least one cheek portion of the body of the structural member.

11. A head cradle comprising:

a structural member including a body having a concave profile and defining a first end and a second end, the body including a forehead portion positioned at the first end and operable to support a forehead of a patient and at least one cheek portion operable to support a cheek of the patient, the body including at least one aperture defined through the structural member at a position adjacent the forehead portion between the first end and the second end, the at least one aperture being operable to align with eyes of the patient and at least one of the nostrils and mouth of the patient; and a support member body defining a first end and a second end, the support member body including a forehead portion positioned at the first end and operable to support a forehead of a patient and at least one cheek portion operable to support a cheek of the patient, the support member body including at least one aperture defined through the support member at a position adjacent the forehead portion between the first end and the second end, the at least one aperture being operable to align with eyes of the patient and at least one of the nostrils and mouth of the patient, the support member body including a removable portion positioned at the second end of the support member body, wherein the support member body includes a line of perforations between the second end and the at least one aperture, the removable portion being defined between the perforations and the second end, and wherein the support member body includes a first side and a second side, wherein the line of perforations extends from the first side to the second side.

12. The head cradle of claim 11, wherein the support member body includes a recessed portion operable to receive the head of the patient, wherein the forehead portion and the at least one cheek portion are defined at least partially within the recessed portion.

13. The head cradle of claim 11, wherein at least a portion of the line of perforations extend through the support member body along at least a portion of the recessed portion.

14. The head cradle of claim 11, wherein the line of perforations includes a curved shape.

15. The head cradle of claim 11, wherein the support member comprises a foam.

16. The head cradle of claim 11, wherein the support member body is injection molded.

17. The head cradle of claim 11, further comprising a coating applied to the support member body.

* * * * *